(12) United States Patent
Lee et al.

(10) Patent No.: US 12,111,898 B2
(45) Date of Patent: Oct. 8, 2024

(54) DEVICES AND METHODS FOR SMARTPHONE IMPOSTOR DETECTION USING BEHAVIORAL AND ENVIRONMENTAL DATA

(71) Applicant: THE TRUSTEES OF PRINCETON UNIVERSITY, Princeton, NJ (US)

(72) Inventors: Ruby Lee, Princeton, NJ (US); Guangyuan Hu, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 134 days.

(21) Appl. No.: 17/668,142

(22) Filed: Feb. 9, 2022

(65) Prior Publication Data

US 2022/0269759 A1  Aug. 25, 2022

Related U.S. Application Data

(60) Provisional application No. 63/147,608, filed on Feb. 9, 2021.

(51) Int. Cl.
*G06F 21/31* (2013.01)
*G06F 21/00* (2013.01)
(Continued)

(52) U.S. Cl.
CPC .......... *G06F 21/316* (2013.01); *G06F 21/604* (2013.01); *H04W 12/30* (2021.01)

(58) Field of Classification Search
CPC ........ G06F 21/604; G06F 21/30; G06F 21/31; G06F 21/316; G06F 21/32; G06F 21/45; G06F 21/50
See application file for complete search history.

(56) References Cited

U.S. PATENT DOCUMENTS

10,284,601 B1 *   5/2019   Bar-Menachem ....... G07G 3/00
2013/0102283 A1 * 4/2013   Lau .................... G06Q 30/0269
                                                        455/411
(Continued)

OTHER PUBLICATIONS

Chen, T. et al., "DianNao: a small-footprint high-throughput accelerator for ubiquitous machine-learning," 19th International Conference on Architectural Support for Programming Languages and Operating Systems, Mar. 1-5, 2014, Salt Lake City, Utah, online Feb. 2014, ACM, pp. 269-283.

(Continued)

*Primary Examiner* — Edward Zee
(74) *Attorney, Agent, or Firm* — Withrow & Terranova, P.L.L.C.

(57) ABSTRACT

Devices and methods for smartphone impostor detection using behavioral and environmental data are provided. Impostors are attackers who take control of an electronic device (e.g., a smartphone) and gain access to confidential and private information of a legitimate user. Embodiments described herein propose a defense-in-depth mechanism to detect impostors quickly with simple deep learning algorithms, which can achieve better detection accuracy than previous works. Embodiments then consider protecting the privacy of the behavioral and/or environmental data (e.g., collected by one or more sensors) of a user by not exposing it outside the protected device. A recurrent neural network (RNN)-based deep learning algorithm is proposed which uses only sensor data of the legitimate user to learn their normal behavior. Prediction error distribution (PED) is used to enhance the detection accuracy. In some embodiments, a minimalist hardware module, dubbed smartphone impostor detector (SID), is integrated into smartphones for self-contained impostor detection.

20 Claims, 6 Drawing Sheets

(51) Int. Cl.
*G06F 21/60* (2013.01)
*H04W 12/30* (2021.01)

(56) References Cited

U.S. PATENT DOCUMENTS

2016/0299938 A1* 10/2016 Malhotra ............ G06F 18/2433
2017/0035328 A1*  2/2017 Yuen ........................ G01P 13/00

OTHER PUBLICATIONS

Frank, M. et al., "Touchalytics: On the Applicability of Touchscreen Input as a Behavioral Biometric for Continuous Authentication," IEEE Transactions on Information Forensics and Security, vol. 8, Issue 1, Jan. 2013, online Oct. 2012, IEEE, pp. 136-148.

Gao, C. et al., "DeltaRNN: A Power-efficient Recurrent Neural Network Accelerator," Proceedings of the 2018 ACM/SIGA International Symposium on Field-Programmable Gate Arrays, Feb. 2018, ACM, pp. 21-30.

Ehatisham-Ul-Haq, M. et al., "Authentication of Smartphone Users Based on Activity Recognition and Mobile Sensing," Sensors, vol. 17, No. 9, Sep. 2017, MDPI, 31 pages.

He, Z. et al., "Power-Grid Controller Anomaly Detection with Enhanced Temporal Deep Learning, "2019 18th IEEE International Conference on Trust, Security and Privacy in Computing and Communications/13th IEEE International Conference on Big Data Science And Engineering (TrustCom/BigDataSE), Aug. 2019, 8 pages.

Kazachuk, M. et al., "One-Class Models for Continuous Authentication Based on Keystroke Dynamics," International Conference on Intelligent Data Engineering and Automated Learning (IDEAL 2016), online Sep. 2016, Springer International Publishing AG, 10 pages.

Kumar, R. et al., "Continuous Authentication Using One-class Classifiers and their Fusion," International Conference on Identity, Security, and Behavior Analysis (ISBA'18), Jan. 2018, IEEE, 9 pages.

Liatsis, P. et al., "One-class classification in multimodal biometric authentication," 2017 International Conference on Infocom Technologies and Unmanned Systems (Trends and Future Directions)(ICTUS), Dec. 18-20, 2017, Dubai, UAE, IEEE, 6 pages.

Lee, W.-H. et al., "Implicit Smartphone User Authentication with Sensors and Contextual Machine Learning," 2017 47th Annual IEEE/IFIP International Conference on Dependable Systems and Networks (DSN), Jun. 2017, IEEE, 12 pages.

Lee, W.-H. et al., "Multi-sensor authentication to improve smartphone security," 2015 International Conference on Information SystemsSecurity and Privacy (ICISSP), Feb. 9-11, 2015, Angers, France, IEEE, 11 pages.

Liu, D. et al., "PuDianNao: A Polyvalent Machine Learning Accelerator," Proceedings of the Twentieth International Conference on Architectural Support for Programming Languages and Operating Systems (ASPLOS '15), Mar. 2015, ACM, pp. 369-381.

Pankaj, M. et al., "Long Short Term Memory Networks for Anomaly Detection in Time Series," 23rd European Symposium on Artificial Neural Networks, Computational Intelligence and Machine Learning (ESANN 2015), Apr. 2015, Bruges, Belgium, 7 pages.

Nikel, C. et al., "Authentication of Smartphone Users Based on the Way They Walk Using k-NN Algorithm," 2012 Eighth International Conference on Intelligent Information Hiding and MultimediaSignal Processing, Jul. 18-20, 2012, Piraeus-Athens, Greece, IEEE, 5 pages.

Reyes-Ortiz, J.-L. et al., "Transition-Aware Human Activity Recognition Using Smartphones," Neurocomputing, vol. 171, Jan. 2016, Elsevier B.V., 14 pages.

Shen, C. et al., "Performance Analysis of Multi-Motion Sensor Behavior for Active Smartphone Authentication," IEEE Transactions on Information Forensics and Security, vol. 13, No. 1, Jan. 2018, IEEE, 16 pages.

Wang, S. et al., "C-LSTM: Enabling Efficient LSTM Using Structured Compression Techniques on FPGAs," Proceedings of the 2018 ACM/SIGDA International Symposium on Field-Programmable Gat Arrays, Feb. 2018, ACM, pp. 11-20.

Yang, L. et al., "Unlocking Smart Phone through Handwaving Biometrics," IEEE Transactions on Mobile Computing, vol. 14, Issue 5, May 2015, online Jul. 2014, IEEE, pp. 1044-1055.

Zheng, N. et al., "You Are How You Touch: User Verification on Smartphones via Tapping Behaviors," 2014 IEEE 22nd International Conference on Network Protocols, Dec. 2014, IEEE, 12 pages.

* cited by examiner

DEVICES AND METHODS FOR SMARTPHONE IMPOSTOR DETECTION USING BEHAVIORAL AND ENVIRONMENTAL DATA

RELATED APPLICATIONS

This application claims the benefit of provisional patent application Ser. No. 63/147,608, filed Feb. 9, 2021, the disclosure of which is hereby incorporated herein by reference in its entirety.

GOVERNMENT SUPPORT

This invention was made with government support under Contract 1814190 awarded by the National Science Foundation. The government has certain rights in the invention.

FIELD OF THE DISCLOSURE

The present disclosure relates to securitization of electronic devices, such as mobile devices.

BACKGROUND

Smartphone theft is one of the biggest threats to smartphone users. Impostors are defined as adversaries who take over a smartphone and perform actions allowed only for the legitimate smartphone user. Impostor attacks breach the confidentiality, privacy, and integrity of the sensitive personal information stored in the smartphone and/or accessible online through the smartphone. As powerful attackers may already know, or can bypass, the password or personal identification number (PIN) of a legitimate smartphone user, it is desirable to provide a defense-in-depth mechanism to detect impostors quickly before significant damage is incurred.

SUMMARY

Devices and methods for smartphone impostor detection using behavioral and environmental data are provided. Impostors are attackers who take control of an electronic device (e.g., a smartphone) and gain access to confidential and private information of a legitimate user. Embodiments described herein propose a defense-in-depth mechanism to detect impostors quickly with simple deep learning algorithms, which can achieve better detection accuracy than previous works. Embodiments then consider protecting the privacy of the behavioral and/or environmental data (e.g., collected by one or more sensors) of a user by not exposing it outside the protected device.

A recurrent neural network (RNN)-based deep learning algorithm is proposed which uses only sensor data of the legitimate user to learn their normal behavior. Prediction error distribution (PED) is used to enhance the detection accuracy. In some embodiments, a minimalist hardware module, dubbed smartphone impostor detector (SID), can be designed and integrated into smartphones for self-contained impostor detection. SID can support real-time impostor detection at a very low hardware cost and energy consumption compared to other RNN accelerators.

An exemplary embodiment provides a mobile device. The mobile device includes one or more sensors and an impostor detection module coupled to the one or more sensors. The impostor detection module is configured to receive at least one of behavioral data or environmental data from the one or more sensors and detect if an impostor is using the mobile device based on anomalies in the at least one of the behavioral data or the environmental data.

Another exemplary embodiment provides a method for detecting an impostor. The method includes receiving sensor data from an electronic device, analyzing the sensor data to determine a behavioral characteristic corresponding to a user of the electronic device, and determining if the user is an impostor by comparing the behavioral characteristic with expected behavior of an authorized user.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
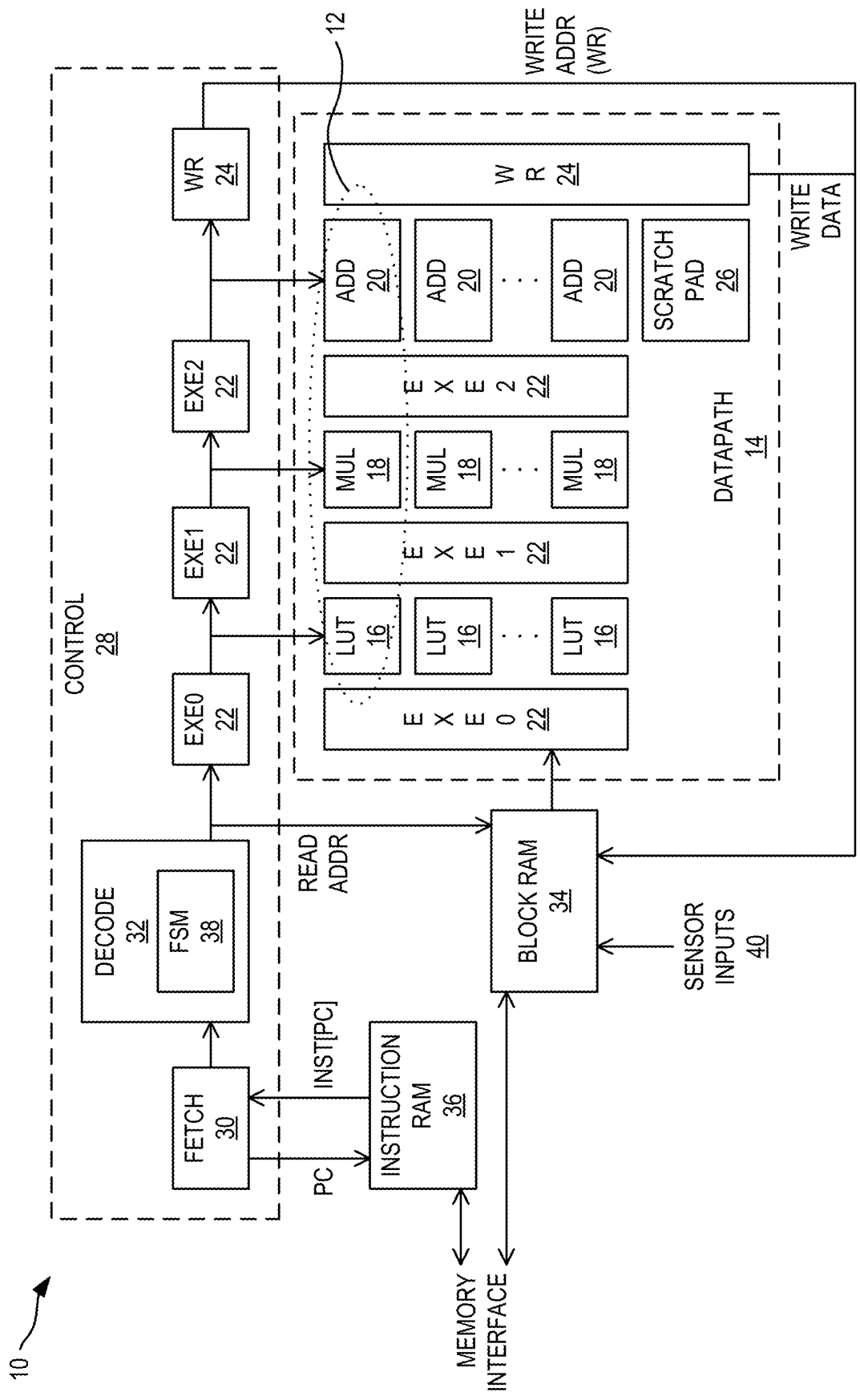
FIG. 1 is a schematic block diagram of an exemplary smartphone impostor detector (SID) according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Devices and methods for smartphone impostor detection using behavioral and environmental data are provided. Impostors are attackers who take control of an electronic device (e.g., a smartphone) and gain access to confidential and private information of a legitimate user. Embodiments described herein propose a defense-in-depth mechanism to detect impostors quickly with simple deep learning algorithms, which can achieve better detection accuracy than previous works. Embodiments then consider protecting the privacy of the behavioral and/or environmental data (e.g., collected by one or more sensors) of a user by not exposing it outside the protected device.

A recurrent neural network (RNN)-based deep learning algorithm is proposed which uses only sensor data of the legitimate user to learn their normal behavior. Prediction error distribution (PED) is used to enhance the detection accuracy. In some embodiments, a minimalist hardware module, dubbed smartphone impostor detector (SID), can be designed and integrated into smartphones for self-contained impostor detection. SID can support real-time impostor detection at a very low hardware cost and energy consumption compared to other RNN accelerators.

I. Introduction

As described above, an impostor may already know, or can bypass, initial security measures on an electronic device, such as a password or personal identification number (PIN) of a legitimate user. Thus, embodiments described herein seek to provide a defense-in-depth mechanism to detect such impostors quickly before significant damage is incurred. Further, embodiments seek to detect these impostors implicitly, such as by using behavioral biometrics (e.g., how the legitimate user typically moves or uses the phone, environments in which the user typically uses the phone, etc.).

The ubiquitous inclusion of motion sensors (e.g., 3-axis accelerometer, the 3-axis gyroscope, ambient light sensors) in smartphones and other mobile devices provides an opportunity to capture environmental and behavioral data of a user, such as large and small motion patterns. In the literature, implicit smartphone user authentication with sensors is primarily modeled as a binary classification problem. While these can also be leveraged as implicit impostor detection systems, these past works require both sensor data of a legitimate user and sensor data of other users for model training. This causes serious privacy issues as users must provide their sensitive behavioral data to a centralized training system. Embodiments described herein protect the privacy of user behavioral biometric data by using anomaly detection methods.

The privacy of user biometric data can be preserved if it does not need to be sent outside the protected device (e.g., to the cloud for training with data from other users). Hence, embodiments propose using only the data of the legitimate user to train an RNN to learn the normal behavior of the legitimate user. A large deviation of the currently observed behavior from behavior predicted by the trained model indicates that the device is not being used by the legitimate user, and hence it is probably being used by an impostor. To achieve high detection accuracy, embodiments further propose comparing PEDs of the model. This can significantly improve the detection accuracy in this type of one-class deep learning scenario.

To reduce the attack surface and the time taken for impostor detection, some embodiments use a small and energy-efficient hardware module (referred to as SID) for impostor detection on a smartphone. While previous machine learning/deep learning accelerators try to maximize the performance of one or a few specific machine learning or deep learning algorithms (e.g., RNN), which is only a part of the detection process, the goal is to support an end-to-end detection process and provide sufficient performance at low cost and low power consumption.

The SID module is flexible in that it supports not only the best deep learning algorithms for impostor detection in both scenarios (with and without data from other users for training) but also other machine learning and deep learning algorithms. Furthermore, it accelerates the computation of empirical probability distributions and statistical tests. SID reuses functional units where possible to reduce hardware size and cost. It is also scalable for higher performance if more parallel datapath tracks are implemented. Programmability provides flexibility in selecting algorithms and adjusting trade-offs in security, privacy, usability, and costs (e.g., execution time, memory requirements and energy consumption).

In this regard, embodiments described herein propose privacy-preserving smartphone detection algorithms that detect impostors and implicitly authenticate users, while protecting their behavioral data privacy. The accuracy of a deep learning algorithm (long short-term memory (LSTM) or other RNN) for detecting abnormal users (i.e., impostors) can be significantly improved by comparing PEDs. When both the user and non-user data are used for centralized (2-class) model training, a simple deep learning algorithm, multi-layer perceptron (MLP), can outperform the previous best implicit user authentication algorithm. A new lightweight hardware module, SID, is versatile, scalable, and efficient for performing impostor detection without preprocessing or postprocessing on the CPU or other devices. Sensor data does not need to be stored and transmitted through the network, thus significantly reducing user data exposure.

II. Threat Model

A threat model used herein considers powerful attackers who can bypass the conventional explicit authentication mechanisms, such as password or PIN. For example, the PIN/password may not be strong enough. The attacker can actively discover the weak PIN/password by guessing or social engineering. Another example is the attacker taking the phone after the legitimate user has entered their password.

It is assumed that the device (e.g., smartphone) has common, built-in motion sensors, such as an accelerometer and gyroscope. It is assumed that the sensor readings are always available. Protecting the privacy of smartphone user behavioral data is explicitly considered. It is assumed that, due to privacy concerns, many smartphone users are not willing to send their sensor data to a centralized authentication service for joint model training with other user data. Two training scenarios are considered: where training is done with other user data and without other user data.

While this disclosure describes a single legitimate user of a device, the detection methodology can be extended to allow multiple legitimate users to share a device by deploying multiple models trained for different legitimate users.

III. Algorithms for Impostor Detection

For impostor detection, three important factors are explicitly considered: attack detection capability (security), usability, and user data privacy of the solution. First, deep learning algorithms are shown to work better than best past works using sensors and machine learning in the conventional 2-class classification scenario (Section III-A). Then the privacy-preserving scenario is explored (Section III-B) where training is performed using only data from the legitimate user.

A. Two-Class Algorithms and Metrics

A good impostor detection solution needs to be able to detect suspicious impostors while not affecting the usability of the smartphone owner. At the center of this trade-off is selecting an appropriate algorithm for impostor detection. A key takeaway described herein is that choosing the right algorithm (and model) is more important for achieving security and performance goals than increasing the model size or adding hardware complexity to accelerate a model.

Previous works on implicit smartphone user authentication mostly leverage (user, non-user) binary classification techniques. This scenario requires both data from the real user and other users for training and is referred to herein as an impostor detection-as-a-service (IDaaS) scenario. For a specific customer, the data from him/herself is labeled as benign or negative (the user), while all data from other customers is labeled as malicious or positive (nonusers). Certain classification-based algorithms are selected which give the best accuracy for impostor detection (security) and legitimate user recognition (usability) in the non-privacy-preserving IDaaS scenario. These are treated as benchmarks when comparing with privacy-preserving impostor detection algorithms.

Among the many machine learning algorithms investigated, the results on support vector machine (SVM) and kernel ridge regression (KRR) are reported. SVM is a powerful and commonly used linear model, which can establish a non-linear boundary using the kernel method. KRR alleviates over-fitting by penalizing large parameters and achieves the highest detection rate in the literature while requiring the computation of fourteen heuristically chosen features. Surprisingly, even a simple deep learning algorithm (MLP) without heuristic and tedious handcrafting can outperform these. MLP is a family of feed-forward neural network models, consisting of an input layer, an output layer and one or more hidden layers in between.

1. Metrics

Security is commonly measured as false negative rate (FNR), the percentage of actual attacks that are not detected. Here, security is instead measured with the inverse term true positive rate (TPR), the percentage of attacks that are detected. Similarly, usability is commonly measured in false positive rate (FPR), the percentage of normal user attempts that are incorrectly detected as attacks. Here, usability is instead measured using the inverse term true negative rate (TNR), which is the percentage of normal user attempts detected as normal. TPR and TNR are metrics where higher is always better.

Equation 1 gives the formula for TPR and TNR, as well as for the other metrics commonly used in comparing the machine learning/deep learning models: accuracy, recall, precision and $F_1$. Accuracy is the percentage of correctly identified samples over all samples. Recall, i.e., TPR, is the percent of all attacks that are detected whereas precision is the percent of all reported attacks that are real attacks. $F_1$ is the harmonic mean of recall and precision.

$$TNR = \frac{TN}{TN + FP}$$

$$TPR = \text{Recall}, R = \frac{TP}{TP + FN}$$

$$\text{Accuracy} = \frac{TN + FP}{TN + FP + TP + FN}$$

$$\text{Precision}, P = \frac{TP}{TP + FP}$$

$$F_1 \text{ Score} = \frac{2 \times \text{Recall} \times \text{Precision}}{\text{Recall} + \text{Precision}}$$

Equation 1

B. Protecting Behavioral Data Privacy

The above binary classification approaches can only be applied to the IDaaS scenario where the data from other users is available. However, smartphone users may not be willing to send their sensor data to a centralized service for training, due to behavioral data privacy concerns. Therefore, another important scenario is considered where the smartphone user only has his/her own data for training. This is referred to as a local anomaly detection (LAD) scenario.

Two representative algorithms are considered for one-class learning, i.e., one-class SVM (OCSVM) and LSTM, which is an RNN algorithm. Embodiments enhance the LSTM-based deep learning models with the comparison of reference and actual PEDs. Generating and comparing the PEDs is key to a successful detection for the LAD scenario.

1. OCSVM

OCSVM is an extension of normal SVM, by separating all the data points from the origin in the feature space and maximizing the distance from this hyperplane to the origin. Intuitively, the OCSVM looks for the minimum support of the normal data and recognizes points outside this support as anomalies.

2. LSTM

Different from the above discussed stateless models (SVM, KRR, OCSVM, etc.), the LSTM model has two hidden states, $h_t$ and $c_t$, which can remember the previous input information. An LSTM cell updates its hidden states ($h_t$, $c_t$) using the previous states ($h_{t-1}$, $c_{t-1}$) and the current input $x_t$ as described in Equation 2, where W and U are weight matrices, and b is a bias vector. tanh(•) and σ(•) are activation functions.

$$cand_t = \tan h(W_c \times x_t + U_c \times h_{t-1} + b_c)$$

$$f_t = \sigma(W_f \times x_t + U_f \times h_{t-1} + b_f)$$

$$i_t = \sigma(W_i \times x_t + U_i \times h_{t-1} + b_i)$$

$$o_t = \sigma(W_o \times x_t + U_o \times h_{t-1} + b_o)$$

$$c_t = f_t \odot c_{t-1} + i_t \odot cand_t$$

$$h_t = o_t \odot \tan h(c_t) \qquad \text{Equation 2}$$

An LSTM-based model is used as an outlier detector, by training it to predict the next sensor reading and investigating the prediction errors. The intuition is that an LSTM model trained on only the normal user's data predicts better for his/her behavior than for other users' behavior. The deviations of the actual monitored behavior from the predicted behavior indicate anomalous behavior. Typically, a threshold value is used to decide if the prediction error is normal or not.

3. LSTM+Comparing Prediction Error Distributions (PEDs)

Inspired by previous work in another domain, it is expected that a single prediction error may vary significantly, but the probability distribution of the errors is more stable. Therefore, comparing the observed PED and a reference PED from the real user's validation data is more stable than comparing the average prediction error with a pre-calculated threshold. With PED, very accurate deep learning prediction from the LSTM model is not essential.

As it is not necessary to assume the prior distribution of PED, nonparametric tests are powerful tools to determine if two distributions are the same. The Kolmogorov-Smirnov (KS) test is a statistical test that determines whether two independent and identically distributed (i.i.d) sets of samples follow the same distribution. The KS statistic for two sets with n and m samples is:

$$D_{n,m} = \sup_x |F_n(x) - F_m(x)| \qquad \text{Equation 3}$$

where $F_n$ and $F_m$ are the empirical distribution functions of two sets of samples respectively, i.e., $$F_n(t) = \frac{1}{n} \Sigma_{i=1}^n 1_{x_i \le t}$$

and sup is the supremum function. The null hypothesis that the two sets of samples are i.i.d. sampled from the same distribution is rejected at level α if:

$$D_{n,m} > c(\alpha) \sqrt{\frac{n+m}{nm}} \qquad \text{Equation 4}$$

where $c(\alpha)$ is a pre-calculated value and can be found in the standard KS test lookup table.

C. Algorithm Experimental Settings

The algorithms for impostor detection are evaluated using the WALK subset in the Human Activities and Postural Transitions (HAPT) dataset (as described in Jorge-L Reyes-Ortiz, Luca Oneto, Albert Samà, Xavier Parra, and Davide Anguita, "Transition-Aware Human Activity Recognition Using Smartphones," in Neurocomputing 171 (2016), pp. 754-767) at UCI (Dua Dheeru and Efi Karra Taniskidou, UCI Machine Learning Repository (2017), http://archive-.ics.uci.edu/ml). The HAPT dataset contains smartphone sensor readings. The smartphone is worn on the waist of each of 30 participants of various ages from 19 to 48. Each reading consists of 3-axial measurements of both linear acceleration and angular velocity, so it could be treated as a 6-element vector. The sensors are sampled at 50 Hz. For the evaluation, 25 out of the 30 users in the HAPT dataset are selected as registered users while the other 5 users act as unregistered users. To investigate the feasibility of user versus impostor classification, the samples from the correct user are labeled negative for impostor detection while all the data from the other 24 registered users and the 5 unregistered users are labeled as positive.

In the IDaaS scenario, each data sample used in both training and testing contains 64 consecutive readings from the same user. At 50 Hz sampling frequency, 64 readings correspond to 1.28 seconds (s), which is the latency to detect an impostor. Models are trained for each registered user using his/her data and randomly picked sensor data of the other 24 registered users. The training samples are ensured to have no overlap with the testing samples. The samples from unregistered users are used to examine whether unseen attackers can be successfully detected.

In the LAD scenario, the training data is only from the real user. The testing samples still include the data from the real user and the other users. The evaluation tests for window sizes of 64, which is the same size as the IDaaS scenario, and 200, which corresponds to a longer detection latency of 4 s but shows an improvement in detection accuracy (see Table 2 below). An LSTM-based model is trained to minimize its average prediction error for each registered user. In the testing of LSTM-based models, prediction errors for consecutive readings in each sample form a testing PED.

D. Algorithm Evaluation

Each of the 25 registered users is evaluated against each of the 30 users (i.e., 750 test pairs in total), and the average metrics of all pairs are reported. Table 1 and Table 2 show the results of different algorithms in the IDaaS and the LAD scenarios, respectively. Table 1 shows that in the IDaaS scenario, the SVM model outperforms the other models, including KRR with 14 manually designed features, on all evaluated metrics. A simple deep learning model, MLP, performs almost as well, achieving accuracy>97%. Larger models, e.g., MLP-500 and models with more layers, e.g., MLP-200-100, also slightly improve the accuracy.

TABLE 1

Impostor detection in the IDaaS scenario using binary classification models
64-reading window

| Models | TNR (%) | TPR/Recall (%) | Accuracy (%) | P | $F_1$ |
|---|---|---|---|---|---|
| KRR | 88.91 | 82.66 | 85.78 | 0.87 | 0.83 |
| SVM | 99.26 | 97.57 | 98.42 | 0.99 | 0.98 |
| MLP-50 | 98.31 | 92.70 | 95.51 | 0.98 | 0.94 |
| MLP-100 | 98.60 | 94.65 | 96.63 | 0.98 | 0.96 |
| MLP-200 | 98.41 | 95.72 | 97.06 | 0.98 | 0.97 |
| MLP-500 | 98.68 | 95.47 | 97.07 | 0.99 | 0.96 |
| MLP-50-25 | 98.13 | 94.49 | 96.31 | 0.98 | 0.96 |
| MLP-100-50 | 98.44 | 95.45 | 96.95 | 0.98 | 0.96 |
| MLP-200-100 | 98.47 | 95.72 | 97.10 | 0.98 | 0.97 |

Table 2 shows the approaches evaluated for the LAD scenario, for 2 window sizes of 64 and 200 sensor measurements. For each LSTM algorithm, different hidden state sizes are also tested, from 50 to 500. LSTM-th compares the average prediction error in a window with a threshold obtained from the validation set, while PED-LSTM-Vote compares the empirically-derived PEDs. Twenty samples of prediction errors are randomly chosen from the validation set and used to represent the reference PEDs. In the testing phase, the PED of each testing sample is compared to all the reference distributions. The PED-LSTM-Vote models consider a sample as abnormal if more than half of the D statistics of the KS tests are larger than the fixed threshold in Equation 4. Table 2 shows the results for the α-values that give the best detection accuracy, i.e., α=0.10 for a 64-reading window and α=0.05 for a 200-reading window.

TABLE 2

Impostor detection accuracy in the LAD scenario using one-class models

| Models | | TNR (%) | TPR/Recall (%) | Accuracy (%) | Avg P | Avg $F_1$ |
|---|---|---|---|---|---|---|
| 64-reading window | | | | | | |
| OCSVM | | 64.24 | 74.19 | 69.22 | 0.59 | 0.65 |
| LSTM-th | 50 | 79.37 | 65.13 | 72.25 | 0.59 | 0.60 |
| | 100 | 78.76 | 66.72 | 72.74 | 0.61 | 0.62 |
| | 200 | 78.50 | 69.64 | 74.07 | 0.62 | 0.64 |
| | 500 | 79.14 | 70.29 | 74.71 | 0.63 | 0.65 |
| PED-LSTM-Vote (α = 0.10) | 50 | 85.55 | 83.60 | 84.58 | 0.84 | 0.84 |
| | 100 | 87.80 | 85.68 | 86.74 | 0.86 | 0.85 |
| | 200 | 89.27 | 85.00 | 87.13 | 0.85 | 0.87 |
| | 500 | 87.02 | 83.86 | 85.44 | 0.84 | 0.86 |
| 200-reading window | | | | | | |
| OCSVM | | 50.02 | 75.81 | 62.92 | 0.55 | 0.62 |
| LSTM-th | 50 | 72.43 | 67.04 | 69.74 | 0.57 | 0.60 |
| | 100 | 72.20 | 69.27 | 70.73 | 0.58 | 0.62 |
| | 200 | 67.88 | 71.60 | 69.74 | 0.58 | 0.62 |
| | 500 | 67.57 | 74.42 | 70.99 | 0.60 | 0.62 |
| PED-LSTM-Vote (α = 0.05) | 50 | 82.16 | 91.96 | 87.06 | 0.92 | 0.85 |
| | 100 | 84.98 | 93.20 | 89.09 | 0.93 | 0.86 |
| | 200 | 88.49 | 92.00 | 90.24 | 0.92 | 0.89 |
| | 500 | 87.14 | 91.16 | 89.15 | 0.91 | 0.88 |

In Table 2, the OCSVM achieves an average accuracy of 62-69%, thirty percent worse than the 2-class SVM model trained with positive data involved. The LSTM-th models (64-reading window) have an accuracy between 72% and 75%, only slightly better than the OCSVM model, regardless of the hidden state size. If PED and statistical KS test are leveraged, a significant improvement is shown in the detection accuracy up to 87.1% and 90.2% for a 64-reading window and a 200-reading window, respectively. However, the overhead in execution time may increase. Section V discusses such security-performance trade-offs, which are essential to algorithm selection in practice.

E. Insights from Algorithm Performance

The results in Section III-D show that in the IDaaS scenario, detection in 1.28 s with very high sensitivity levels (95%-99%) can be achieved for accuracy, security (TPR) and usability (TNR) when SVM or MLP models are used. In the data-privacy preserving LAD scenario, the detection accuracy, using the LSTM-based models enhanced by collecting error distributions, can reach 87.13% for the same detection latency of 1.28 s. If the user allows a detection latency of 4 s, which is usually not long enough for an impostor to perform malicious operations on the smartphone after stealing it, the accuracy can be increased to 90.24%. Although the accuracy is not perfect, it is comparable to state-of-the-art one-class smartphone authentication approaches using various handcrafted features and complex model fusion. Also, the privacy-preserving one-class model (PED-LSTM-Vote-200) achieves better detection accuracy, $F_1$ score, TPN and TNR results than the state-of-the-art two-class KRR model with hand-crafted features for this data set when both are using a 64-reading window.

A key contribution made herein is to show that it is the PEDs and KS test that provide the significant increase in detection capability. While tuning the size of deep learning models, e.g., LSTM, has little impact on accuracy, the KS test for PED comparison increases the overall accuracy by +12.4% for the 64-reading window and +19.2% for the 200-reading window. Therefore, hardware support for generating empirical PEDs and computing the KS statistic is provided in Section IV-D.

IV. Hardware Detection Module

One goal is to design a small but versatile hardware module that can be integrated into a smartphone to perform the entire impostor detection, without needing another processor or accelerator. This not only eliminates the network and cloud attack vectors, but also reduces the cost to move data and the contention with other applications for computing on the CPU or the GPU. Ideally, the hardware module can read the latest sensor measurements from a buffer so that the main memory does not need to be involved.

Design goals of the SID module include: suitability for smartphones and other battery and resource-constrained devices, reduced attack surface for better security, flexibility for different machine learning/deep learning algorithms and trade-offs of security, usability, privacy, execution time, storage and energy consumption, and scalability for more performance in the future if needed.

Unlike prior works on implementing deep learning models in hardware, this disclosure is interested in neither the highest performance nor the lowest energy consumption. Rather, this disclosure investigates what performance is sufficient with minimum hardware that can achieve an important security goal (like impostor detection), while still being flexible for future needs, such as different algorithms or more performance. To reduce the attack surface, SID should be able to support detection without subsequent processing on another device like the CPU. This includes collecting and comparing empirical probability distributions to enhance deep learning models.

While one goal is to perform the best algorithms for impostor detection, namely, MLP and SVM for the IDaaS scenario, and PED-LSTM-Vote for the LAD scenario, it is also desired that SID be flexible enough to support other machine learning/deep learning algorithms as well. For performance scalability, SID is designed to allow more parallel data tracks to be implemented, if desired. An innovative aspect of the design is that the SID macro instructions implementing the selected machine learning/deep learning algorithms do not even have to be changed when the number of parallel tracks is increased, and performance increased. This is in line with the goal of minimal hardware.

A. Functional Operations Supported

First, the operations needed by the deep learning (and machine learning) algorithms to be implemented are determined. These are first the PED-LSTM algorithm, and the MLP and SVM algorithms, which are the best impostor detection algorithms for the two scenarios considered in the previous section. Table 3 shows the operations needed for these different machine learning/deep learning algorithms. The instructions from Vargmax to Vsqrt (at the bottom of Table 3) are needed only by the KRR algorithm, the previous highest performing method, to compute the 7 features for the accelerometer and the gyroscope each, i.e., the average, maximum, minimum and variance of the sensor data and three frequency domain features: the main frequency and its amplitude and the second frequency. These operations are not implemented, since they are not needed by the other higher-performing algorithms while needing significant extra hardware.

TABLE 3

Computation primitives needed by different machine learning/deep learning models and statistical testing

| | | IDaaS | | | LAD | | | | | |
|---|---|---|---|---|---|---|---|---|---|---|
| | | | | | OCSVM | | | | | |
| Operation | Description | KRR | MLP | SVM Basic | SVM w/ Gaussian Kernel | w/ Gaussian Kernel | LSTM | KS-test | PED-LSTM-Vote | Support Status |
| Vadd | Element-wise addition of two vectors | ✓ | ✓ | ✓ | ✓ | ✓ | ✓ | ✓ | ✓ | Yes |
| Vsub | Element-wise subtraction of two vectors | | | | ✓ | ✓ | ✓ | ✓ | ✓ | Yes |
| Vmul | Element-wise multiplication of two vectors | ✓ | | | ✓ | ✓ | ✓ | ✓ | ✓ | Yes |
| Vsgt | Element-wise set-greater-than of two vectors | ✓ | ✓ | ✓ | ✓ | ✓ | ✓ | | ✓ | Yes |
| Vsig | Sigmoid function of a vector | ✓ | ✓ | | | | ✓ | | ✓ | Yes |
| Vtanh | Tanh function of a vector | | ✓ | | | | ✓ | | ✓ | Yes |
| Vexp | Exponential function of a vector | | | | ✓ | ✓ | | | | Yes |
| MVmul | Multiplication of a matrix and a vector | ✓ | ✓ | ✓ | ✓ | ✓ | ✓ | | ✓ | Yes |
| VSsgt | Set-greater-than to compare a scalar and a vector's elements | | | | | | | ✓ | ✓ | Yes |
| Vmaxabs | Find the maximum absolute value of a vector | ✓ | | | | | | ✓ | ✓ | Yes |
| Vsqnorm | Squared L₂-norm of a vector | | | | ✓ | ✓ | ✓ | | ✓ | Yes |
| Vargmax | Find the index of the maximum in a vector | ✓ | | | | | | | | No |
| Vmin | Find the minimum in a vector | ✓ | | | | | | | | No |
| Vmax2 | Find the largest number in a vector | ✓ | | | | | | | | No |
| VFFT | Compute the Fourier transform of a vector | ✓ | | | | | | | | No |

TABLE 3-continued

Computation primitives needed by different machine learning/deep learning models and statistical testing

| Operation | Description | KRR | MLP | IDaaS SVM Basic | SVM w/ Gaussian Kernel | LAD OCSVM w/ Gaussian Kernel | LSTM | KS-test | PED-LSTM-Vote | Support Status |
|---|---|---|---|---|---|---|---|---|---|---|
| Vsqrt | Compute the square root of each element in a vector | ✓ | | | | | | | | No |

B. Programming Model and Macro-Instruction

The programming model of SID is to execute macro-instructions, where each macro instruction is a whole vector or matrix operation. The number of iterations is automatically determined by the hardware, in a finite state machine (FSM), based on the hardware's knowledge of the number of parallel data tracks available in the implementation. The macro-instruction supplies the type of operation needed and the dimensions of the vector or matrix.

The format of an SID macro instruction is shown in Table 4. The Mode field specifies one of the operation modes in Table 3. Three memory addresses can be specified in a macro-instruction: Addr_x and Addr_y for up to two operands, and Addr_z for the result. Instead of implementing vector machines with vector registers of fixed length, memory is used to store the vector or matrix operands and results. This design is less expensive than vector registers. It is also more efficient since it supports the flexible-size inputs and outputs and operates seamlessly with automatic hardware control of the execution of a vector or matrix operation. This is one way (memory not vector registers) to use minimal hardware and achieve scalability (macro-instruction with FSM control).

TABLE 4

SID Macro-instruction with Scalable FSM Control

| 127 124 | 123 110 | 109 96 | 95 64 | 63 32 | 31 0 |
|---|---|---|---|---|---|
| Mode 4 bits | Length 14 bits | Width 14 bits | Addr_x 32 bits | Addr_y 32 bits | Addr_z 32 bits |

Each macro-instruction initializes the FSM state of the control unit to indicate the number of iterations of the specified operation. Each cycle, the FSM updates the number of uncomputed iterations, according to the number of parallel tracks, to decide when a macroinstruction finishes (details in the following paragraphs). Thus, the same SID software program can run on SID hardware modules with a different number of parallel tracks, without modification. This achieves the performance scalability goal.

The Length and Width fields can initialize three state registers, reg_length, reg_width, and reg_width_copy, which define the control FSM state. The FSM can be configured by instructions in two ways: the one-dimension iteration and the matrix-vector iteration. For the one-dimension iteration in a vector operation, the value of reg_length is initialized by the length field of the instruction. During execution, reg_length is decreased every cycle by N(track), which is the number of parallel datapath tracks, until reg_length is no larger than N(track) and the next instruction will be fetched.

When an instruction for a matrix-vector operation is fetched, the Length field initializes reg_length and the Width field initializes both reg_width and reg_width_copy. A matrix-vector multiplication macro-instruction computes the product of a matrix of size Width-by-Length with a vector containing Length elements. The SID module performs loop tiling by computing a tile of Width rows by N(track) columns in the matrix before moving to the next tile. When the last tile of columns in the matrix is computed, the next instruction can be fetched.

C. Parallel Datapaths and Functional Unit Reuse

FIG. 1 is a schematic block diagram of an exemplary SID 10 according to embodiments described herein. This SID 10 implementation has two or more (e.g., four) parallel tracks 12 in a datapath 14. Each track 12 includes a look-up table (LUT) 16, a multiplier (MUL) 18, and an adder (ADD) 20, which are put into three consecutive pipelined execution stages 22 (EXE0, EXE1, and EXE2) followed by a write stage 24. A small local scratchpad memory 26 is implemented in the last execution stage 22 (EXE2) for faster access to intermediate results during a macro-instruction.

The SID 10 includes a control path 28 which has six pipeline stages: fetch 30, decode instruction 32, the three execution stages 22, and the write stage 24 to write the result back to memory at a given write address in block memory 34 of the mobile device incorporating SID 10. Instructions may be stored in instruction memory 36 of the mobile device incorporating SID 10.

Each macro-instruction (e.g., stored in the instruction memory 36 and fetched at 30) is decoded into an FSM 38 control mechanism in the decode instruction stage 32 of the SID control path 28. This design is scalable since the hardware is aware of the number of parallel tracks 12 in the datapath 14 and can perform automatic control of the FSM 38 for vector and matrix operations, and any loop iterations required. For performance, the control by an FSM 38 avoids using branch instructions for frequent jump-backs in loop-control, as is needed in general-purpose processors, which can take up a large portion of processor throughput for the simple loops needed to implement vector and matrix computation.

Two optimizations are discussed: reducing the number of memory accesses with local storage and minimizing the hardware design cost by reusing functional units.

When computing the matrix-vector multiplication in the MV-mul mode, the local scratchpad memory 26 and loop tiling are used to save the latency of storing and accessing partial sums from memory and also reduce the memory traffic. In the Vmaxabs mode, which finds the maximum absolute value in a vector by doing a comparison of input elements in the EXE2 stage, a temporary maximum is stored in the local scratchpad memory 26 to reduce external memory accesses; it gets updated every cycle. In the Vsqnorm mode, which computes the squared L2-norm of a vector, the local scratchpad memory 26 stores the partial sum of $x[i]^2$ (x is the input vector), which are computed by the multipliers and adders in the EXE1 and EXE2 stages.

When computing non-linear functions like sigmoid (Vsig), tanh (V tanh) and exponential (Vexp), embodiments avoid implementing complex non-linear functional units, but instead use the flexible LUT 16 to look up the slope and intercept for linear approximation. An added benefit of this approach over prior works is that the LUTs 16 are placed before the multipliers 18 and adders 20 in the three consecutive execution stages 22 so that no extra multipliers 18 or adders 20 are needed. The ELE0 (LUT 16) stage of SID 10 outputs a slope, k[i], and an intercept, b[i], for each input value. The interpolation is then computed in the later two stages 22 as $z[i]=k[i] \times x[i]+b[i]$, with z[i] being the value of the non-linear function for input x[i]. Also, instead of having another adder tree stage for the MVmul mode, hardware cost is reduced by reusing the adders 20 in the EXE2 stage to sum the products computed in the EXE1 stage and the partial sum read from the local scratchpad 26. The new partial sum is written back to the local scratchpad memory 26 if the computation is not finished.

1. Integration in Smartphone SOC

The SID anomaly detection module 10 can be integrated close to device sensors to reduce the attack surface and also to save the overhead of memory accesses. (If software processing was used, the sensor measurements would have to be stored to memory first, then read back from memory to the CPU or GPU for software impostor detection.) Modern smartphones have already implemented the interface to write the collected sensor measurements to a cache memory for efficient signal processing. The SID module 10 can leverage a similar sensor interface 40. A valid incoming sensor input can reset the program counter of SID 10 to the beginning of the detection program.

D. Support for Empirical Distribution Representation and Comparison

Another novel contribution of this work is to show that empirical probability distributions can be collected and compared efficiently using the multipliers and adders already needed for the machine learning/deep learning algorithms. This disclosure is the first to describe the following simple and efficient hardware support for collecting error distributions and comparing them with the KS test.

Two operations are added for this KS test, but these general-purpose operations can be useful for other machine learning/deep learning algorithms and statistical tests as well. The first is a vector-scalar comparison (VSsgt described in Table 3). The second operation is Vmaxabs, which can be used to find the maximum absolute value in a vector. This is illustrated with an example in FIG. 2, showing a five-step workflow.

Figure 2:
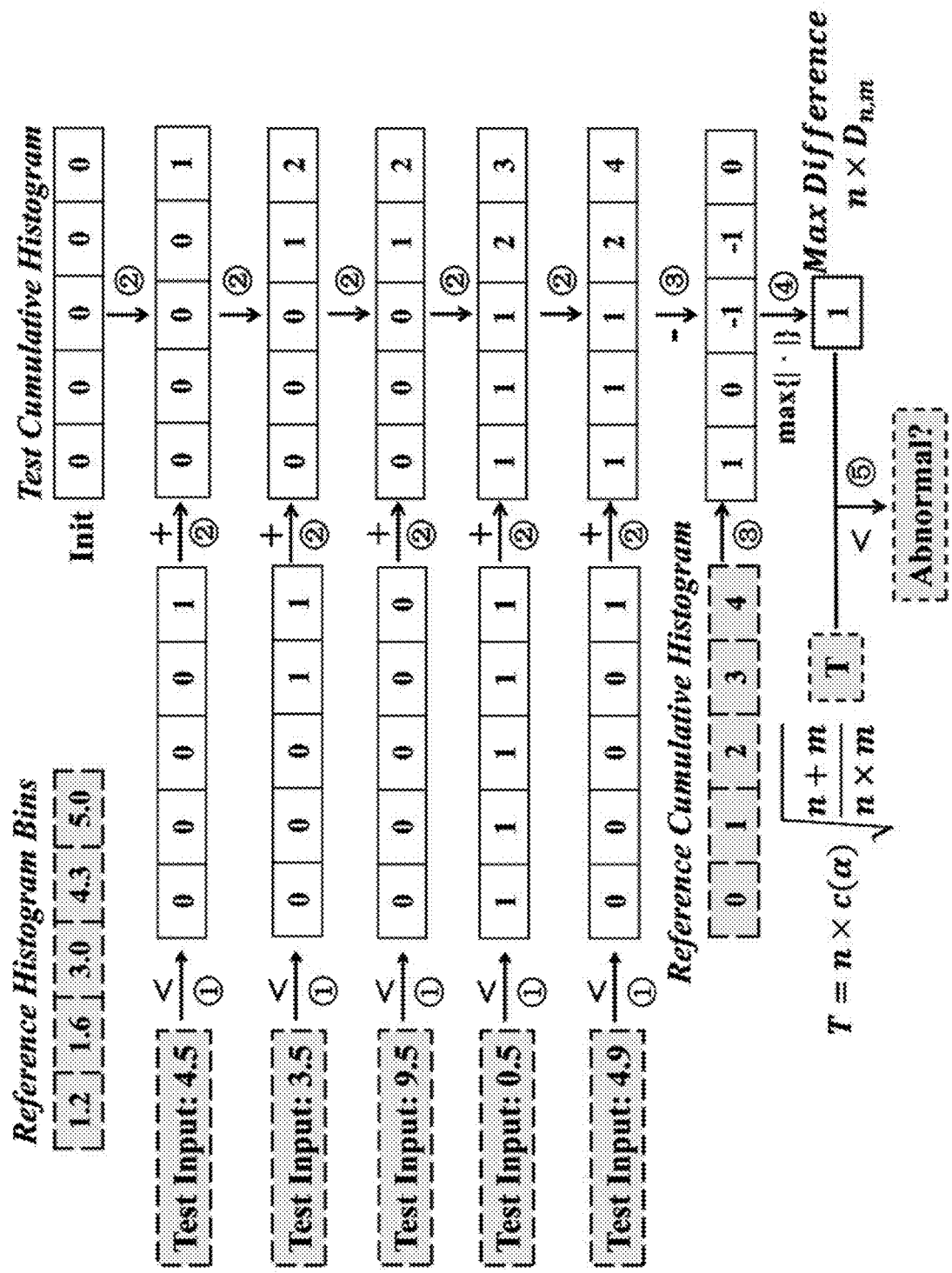
FIG. 2 is a schematic diagram of a five-step workflow for implementing a Kolmogorov-Smirnov (KS) test using the SID of FIG. 1.

FIG. 2 is a schematic diagram of a five-step workflow for implementing a KS test using the SID 10 of FIG. 1. The grey dotted boxes represent inputs, which include the reference PED, the test PED, the threshold and the output. The reference PED is collected in the training phase and is represented by reference histogram bin boundaries and a reference cumulative histogram. The test PED is collected online and represented by a series of observed test errors.

Step ①: compare an observed error with reference bin boundaries. The output of this step is a vector of "0"s and "1"s. "1" means that the corresponding bin boundary is greater than the observed error, and "0" otherwise. This uses the VSsgt operation. Step ②: accumulate all binary vectors from ①. The accumulated vector, namely the "test cumulative histogram", represents the cumulative histogram of the observed test errors using the reference bins. Step ③ and step ④: find the largest difference in the reference and test cumulative histograms. Step ③ is a vector subtraction and step ④ is the Vmaxabs operation, to find the maximum absolute value in a vector. This yields the right-hand side of Equation 3 without dividing by n, the number of data points in the testing error distribution. Hence, $n \times D_{n,m}$ is computed at the end of step ④. Step ⑤: compare the largest difference with a threshold. The equivalent comparison as Equation 4 is performed by multiplying both sides by n. In the experiments, m, which is the number of data points in the reference error distribution, and n are hyper-parameters that are decided during training and always set to be the same. In the example of FIG. 2, both n and m are 5. The test histogram is considered abnormal if the largest difference is larger than the threshold, T.

V. Evaluation

Cost is evaluated in terms of execution time (performance) and memory usage for the detection algorithms from Section III implemented on the SID module 10, and accuracy-cost trade-offs are discussed. It is shown that SID 10 has lower energy consumption and needs much fewer hardware resources than other hardware implementations.

A. Accuracy vs Execution Time

New sensor measurements, e.g., motion sensors like the accelerometer and gyroscope, are available every 20 milliseconds (ms) in most smartphones. Hence, in certain embodiments an impostor cannot be detected in less than this time.

Figure 3:
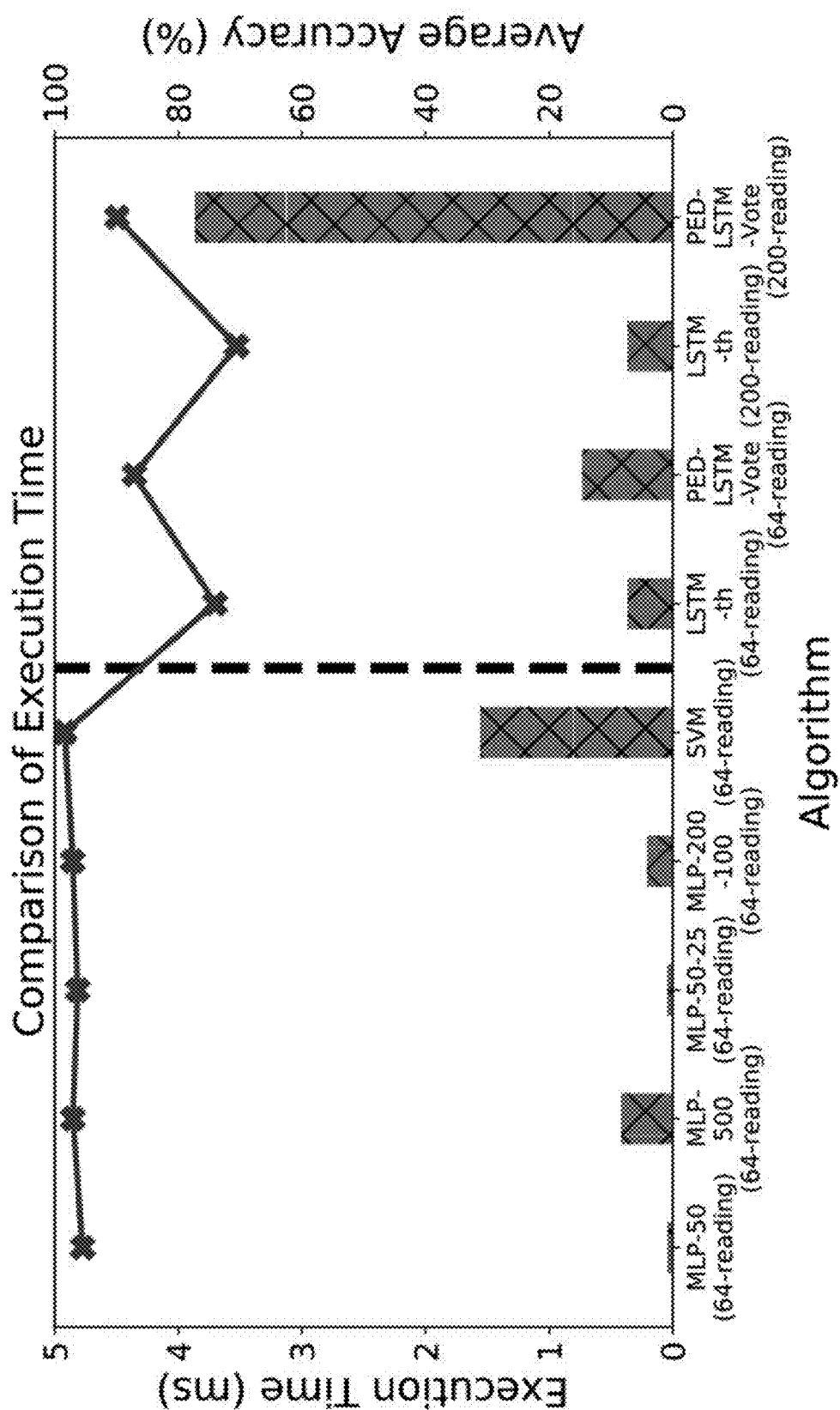
FIG. 3 is a graphical representation comparing different machine learning and deep learning algorithms with respect to accuracy and execution time on the SID.

FIG. 3 is a graphical representation comparing different machine learning and deep learning algorithms with respect to accuracy and execution time on SID 10. The algorithms to the left of the dashed line are used in the IDaaS scenario. Although the SVM algorithm achieves slightly higher accuracy than MLP-200-100 (98.4% versus 97.1%), it needs a longer execution time for performing inferencing.

The algorithms used in the LAD scenario are to the right of the dashed line. The execution time is measured for the best algorithm in Section III-D, i.e., PED-LSTM-Vote, and the baseline algorithm, LSTM-th, for comparison. The best LSTM size, which is 200, is chosen and the cases of both the 64-reading window and the 200-reading window are considered. FIG. 3 shows that while the KS test technique increases the detection accuracy, it also needs additional execution time. However, the execution time (less than 4 ms) of all algorithms is always much smaller than 20 ms, so the performance of SID is more than adequate to achieve impostor detection with the highest accuracy of PED-LSTM-Vote. Depending on the size of the window (64-reading or 200-reading), the detection time from attack to detection by PED-LSTM-Vote is 1.28 s or 4 s (see Section III-E) plus the last 4 ms execution time for the LSTM-PED-Vote inference algorithm. Hence, the execution time of SID is negligible (and more than sufficient) compared to the time to collect sufficient consecutive sensor readings.

B. Accuracy vs. Memory Usage

Figure 4:
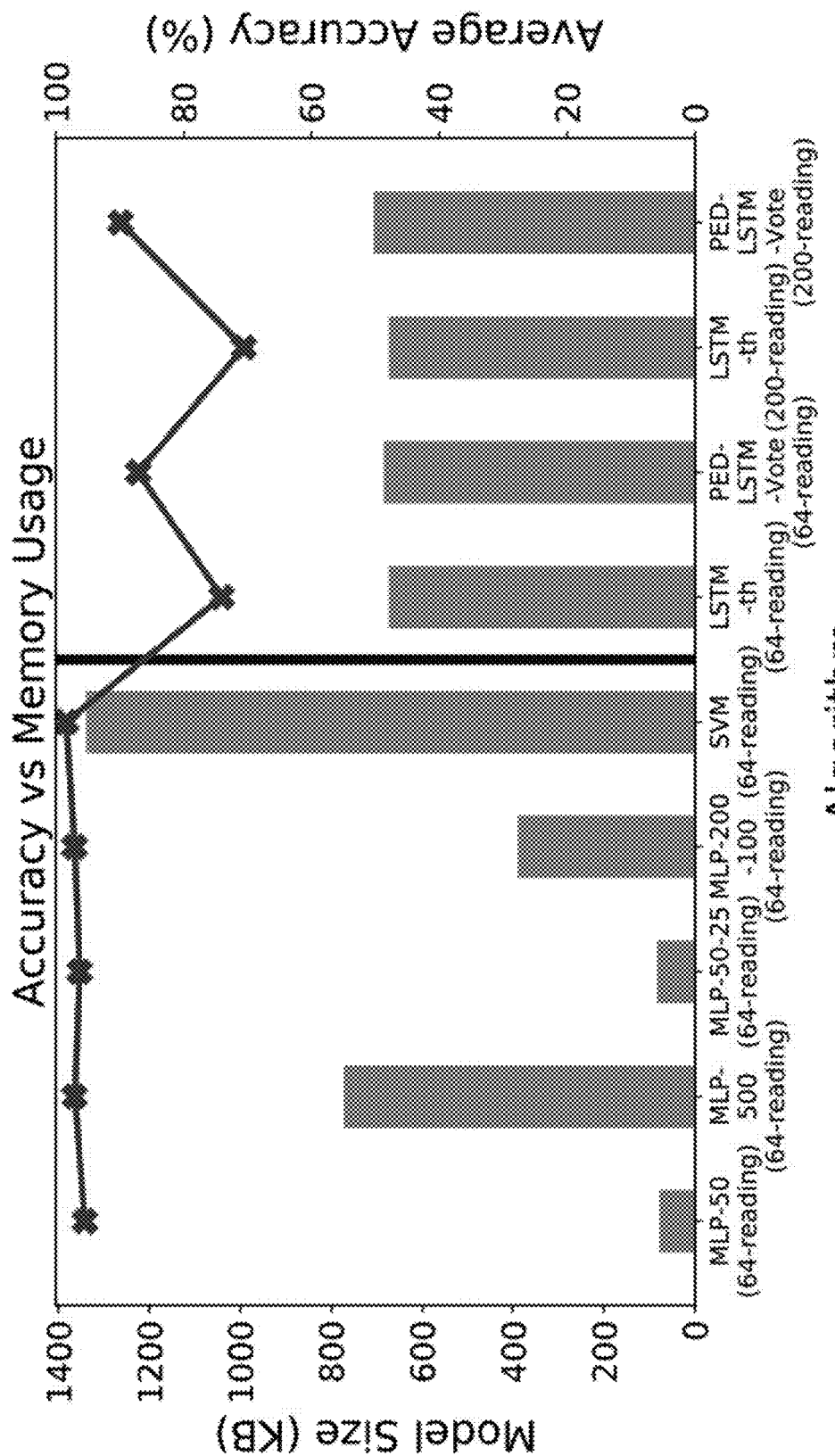
FIG. 4 is a graphical representation comparing models used in an impostor detection-as-a-service (IDaaS) scenario and a local anomaly detection (LAD) scenario, in terms of their accuracy and the model size.

FIG. 4 is a graphical representation comparing models used in the IDaaS and LAD scenarios, in terms of their accuracy and the model size. In the IDaaS scenario (left of the bold line), a 2-layer MLP-200-100 can achieve a slightly higher detection accuracy with a smaller model size than MLP-500. The SVM model has a very small improvement on the accuracy over MLP-200-100 but incurs the highest cost in terms of memory usage as it has to store support vectors. Hence, MLP-200-100 appears to be the best for the cost (execution time+memory usage) versus accuracy trade-off for the IDaaS scenario.

In the LAD scenario (right of the bold line) which is better for protecting the privacy of a user's sensor data, the additional memory usage of the KS test technique is evaluated and compared to the baseline LSTM-th algorithm where the size of the LSTM cell is still 200. PED-LSTM-Vote uses only 1.6% and 4.8% more space, for the 64-reading window and 200-reading window, respectively. They are better choices in the memory-versus-accuracy trade-off as the improvement in accuracy is significant.

C. Hardware Design Complexity

A field programmable gate array (FPGA) prototype of the SID module 10 is implemented in order to show how small a hardware module 10 can be to support impostor detection. The implementation has four parallel tracks 12 and a 256-byte scratchpad memory 26. The size of the datapath random-access memory (RAM) (e.g., block memory 34) is 1.75 MB and the size of the instruction RAM (e.g., instruction memory 36) is 128 KB. This prototype uses 32-bit fixed-point numbers since prior work has shown significant accuracy degradation with 16-bit numbers for certain models. Embodiments of SID 10 would be even smaller if lower-precision numbers are used. The platform board is Xilinx Zynq-7000 SoC ZC706 evaluation kit. The hardware implementation is generated with Vivado 2016.2.

Table 5 compares SID implementing LSTM-PED-Vote to two FPGA implementations of Recurrent Neural Network (RNN) accelerators, C-LSTM (described in Shuo Wang, Zhe Li, Caiwen Ding, Bo Yuan, Qinru Qiu, Yanzhi Wang, and Yun Liang, "C-LSTM: Enabling Efficient LSTM Using Structured Compression Techniques on FPGAs," in *Proceedings of the* 2018 *ACM/SIGDA International Symposium on Field-Programmable Gate Arrays*, ACM, pp. 11-20) and DeltaRNN (described in Chang Gao, Daniel Neil, Enea Ceolini, Shih-Chii Liu, and Tobi Delbruck, "DeltaRNN: A Power-efficient Recurrent Neural Network Accelerator," in *Proceedings of the* 2018 *ACM/SIGDA International Symposium on Field-Programmable Gate Arrays*, ACM, pp. 21-30). The C-LSTM algorithm represents some matrices in LSTM as multiple block-circulant matrices, to reduce the storage and computation complexity. DeltaRNN ignores minor changes in the input of the Gated Recurrent Unit (GRU) RNN to reuse the old computation result and thus reduce the computation workload.

These accelerators are capable of RNN inference, which is found to be important for the LAD scenario, and consist of multiple submodules or pipeline stages. More hardware resources are required because each of the submodules is designed to optimize and compute one specific operation in the inference data flow, e.g., one matrix-vector multiplication or non-linear activation, and the functional units are not reused for different operations. Also, the accelerators have a higher level of parallelism than the SID module. However, they lack the support for generating and comparing empirical PEDs, which has been shown herein to be indispensable to achieve better accuracy.

TABLE 5

SID hardware requirements and power compared to performance-oriented RNN accelerators

|  | C-LSTM | DeltaRNN | SID |
|---|---|---|---|
| Functionality | Supports LSTM only | Supports Gated Recurrent Unit only | Supports LSTM, GRU, other ML/DL models and statistical tests |
| FPGA | Xilinx Virtex-7 XC7Z100 | Kintex-7 | XC7Z045 FFG900 |
| Quantization | 16-bit fixed point | 16-bit fixed point | 32-bit fixed point |
| Slice LUT | 406,861 (49.07×) | 261,357 (31.52×) | 8,292 |
| Slice Flip-flop | 402,876 (106.07×) | 119,260 (31.40×) | 3,798 |
| DSP | 2675 (167.19×) | 768 (48 ×) | 16 |
| BRAM | 966 (1.98×) | 457.5 (0.94×) | 489 |
| Clock Freq | 200 MHz | 125 MHz | 115 MHz |
| Power (W) | 22 | Zynq MMP: 7.3 FPGA: 15.2 | Idle: 0.12 Running: 0.62 |

Table 5 shows a major difference between the minimalist SID module and the performance-oriented accelerators. The FPGA resource usage of Slice LUTs, Slice Flip-flops and DSPs of SID are one or two orders of magnitude less than the other two RNN implementations. The FPGA power consumption is measured using the TI Fusion Digital Power Designer tool while the power of C-LSTM is also measured with a TI Fusion Power device and DeltaRNN with a Voltcraft energy monitor. SID's power consumption is an order of magnitude less, making it more suitable for a smartphone.

While this evaluation used an FPGA implementation to prototype SID, and enable comparisons with existing FPGA accelerators, further power reduction is achievable using an ASIC implementation in real smartphone products.

VI. Process for Impostor Detection

Figure 5:
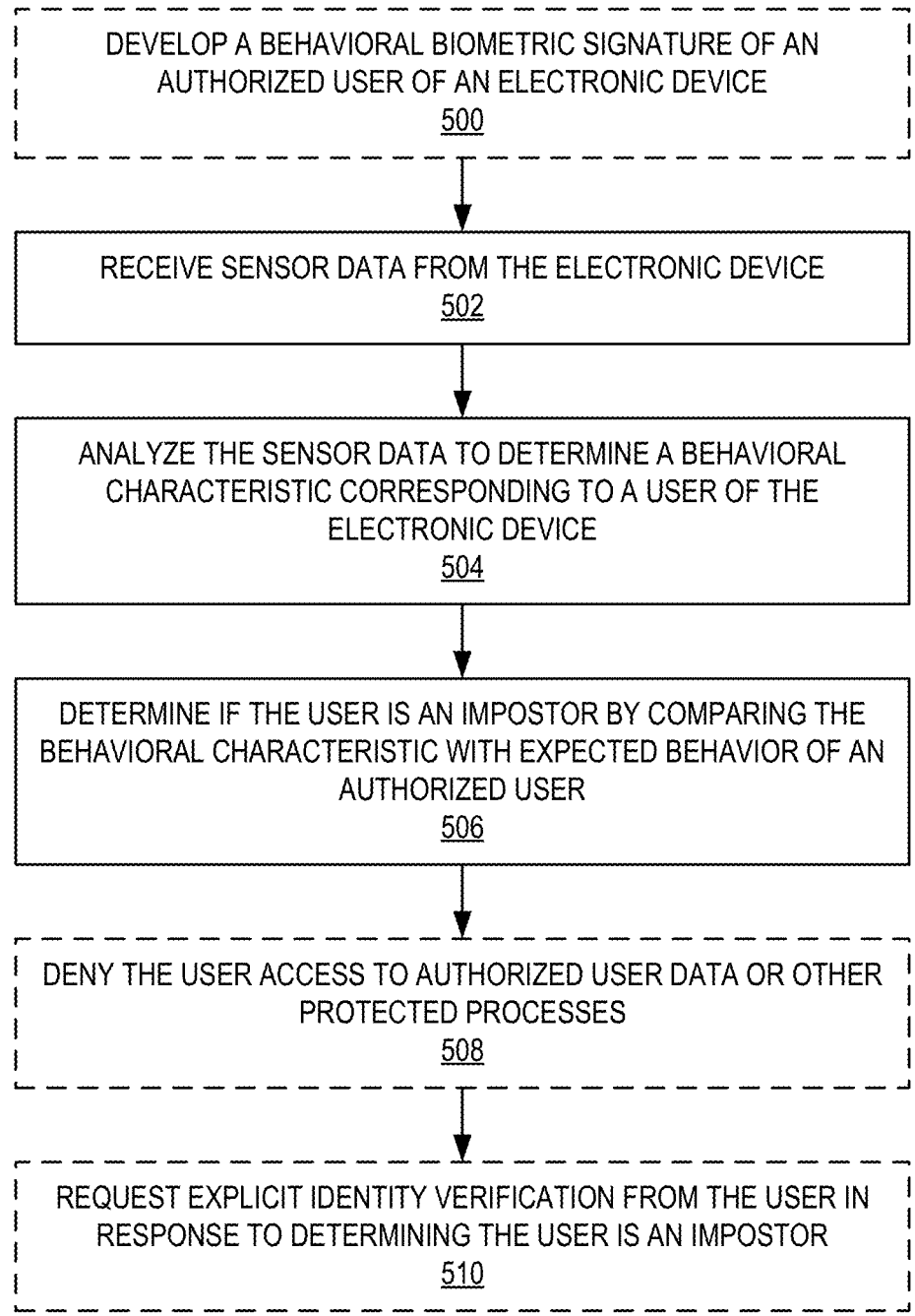
FIG. 5 is a flow diagram illustrating a process for detecting an impostor in a mobile device, such as a smartphone.

FIG. 5 is a flow diagram illustrating a process for detecting an impostor in a mobile device, such as a smartphone. Dashed boxes represent optional steps. The process may optionally begin at operation 500, with developing a behavioral biometric signature of an authorized user of an electronic device. The behavioral biometric signature may be developed through an appropriate machine learning or deep learning algorithm, such as described above. In an exemplary aspect, the behavioral biometric signature can include motion data corresponding to ways in which an authorized user typically uses and holds the mobile device. The behavioral biometric signature may include further measurements corresponding to the environment in which the authorized user typically uses the mobile device, location data, and/or other such data which may be indicative of behavior patterns of the user.

The process continues at operation 502, with receiving sensor data from the electronic device. In an exemplary aspect, the sensor data corresponds to at least motion data (e.g., from an accelerometer and/or gyrometer). In further aspects, the sensor data may correspond to other types of data indicative of user behavior and environment, such as from an ambient light sensor, image sensor, temperature sensor, pressure sensor, and so on. The process continues at operation 504, with analyzing the sensor data to determine a behavioral characteristic corresponding to a user of the electronic device. In an exemplary aspect, the sensor data is analyzed by determining a pattern of motion of the smartphone over time which may be characteristic of the user.

The process continues at operation 506, with determining if the user is an impostor by comparing the behavioral characteristic with expected behavior of an authorized user. For example, the behavioral characteristic may be compared with the behavioral biometric signature developed for an authorized user. The process may optionally continue at operation 508, with denying the user access to authorized user data or other protected processes.

In general, the above actions are performed implicitly, i.e., without requiring the user of the mobile device to cooperate with the SID. Thus, this process may operate as a background process such that the user may not be aware of its operation to reduce any attempts to circumvent the SID. This process may further run at all times or may be initiated by one or more triggering events (e.g., a request for access to protected data or motion of the mobile device). The process may optionally continue at operation 510, with requesting explicit identity verification from the user in response to determining the user is an impostor. For example, the user may be asked to re-enter a password, use two-factor authentication, or otherwise indicate whether the user is authorized Although the operations of FIG. 5 are illustrated in a series, this is for illustrative purposes and the operations are not necessarily order dependent. Some operations may be performed in a different order than that presented. Further, processes within the scope of this disclosure may include fewer or more steps than those illustrated in FIG. 5.

VII. Implementation in Mobile Device

Figure 6:
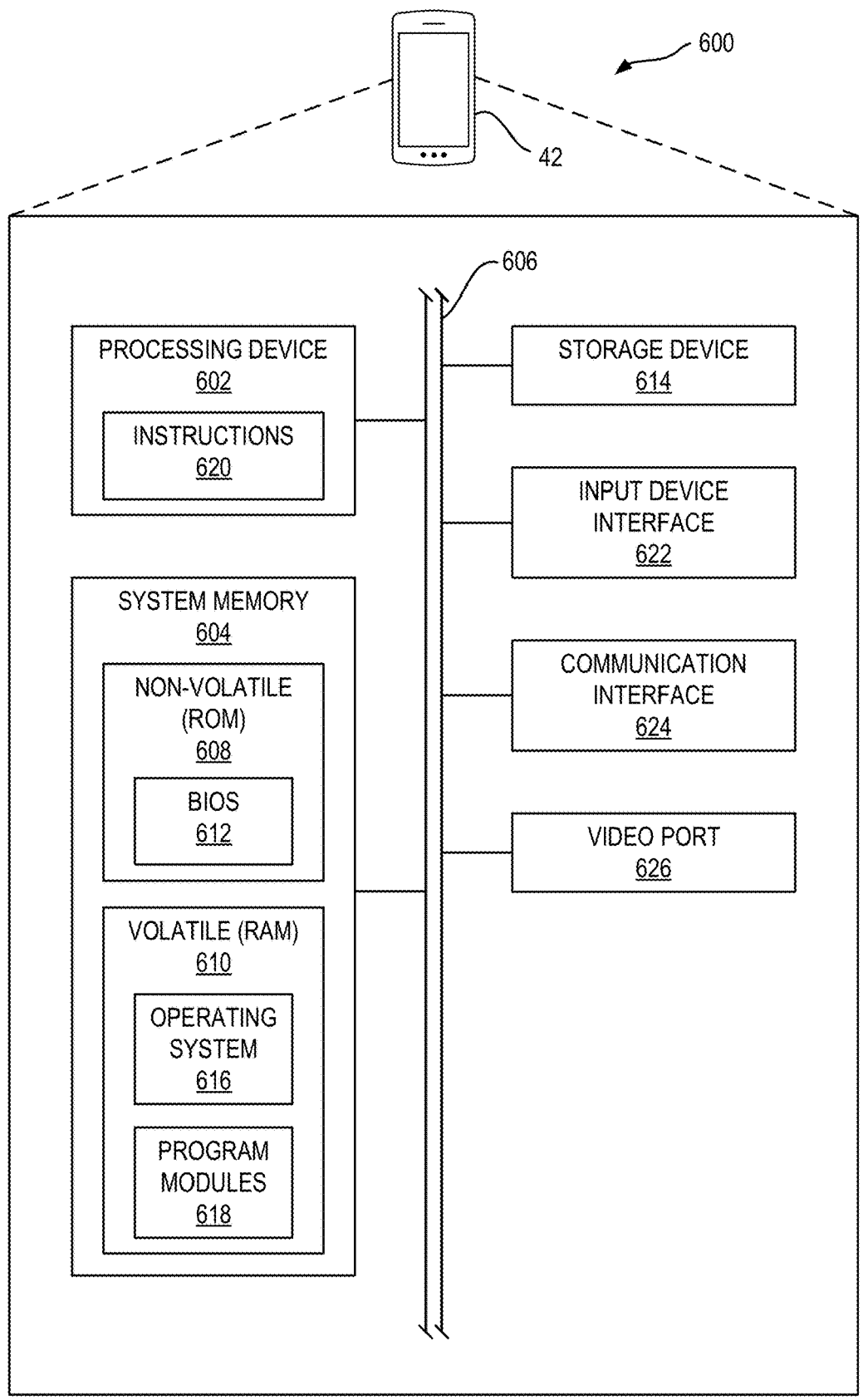
FIG. 6 is a block diagram of a smartphone suitable for implementing the SID module according to embodiments disclosed herein.

FIG. 6 is a block diagram of a smartphone 42 suitable for implementing the SID module 10 according to embodiments disclosed herein. The smartphone 42 includes or is implemented as a computer system 600, which comprises any computing or electronic device capable of including firmware, hardware, and/or executing software instructions that could be used to perform any of the methods or functions described above, such as impostor detection. In this regard, the computer system 600 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 600 in this embodiment includes a processing device 602 or processor, a system memory 604, and a system bus 606. The processing device 602 represents one or more commercially available or proprietary general-purpose processing devices, such as a microprocessor, central processing unit (CPU), or the like. More particularly, the processing device 602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 602 is configured to execute processing logic instructions for performing the operations and steps discussed herein.

In this regard, the various illustrative logical blocks, modules, and circuits described in connection with the embodiments disclosed herein may be implemented or performed with the processing device 602, which may be a microprocessor, FPGA, a digital signal processor (DSP), an application-specific integrated circuit (ASIC), or other programmable logic device, a discrete gate or transistor logic, discrete hardware components, or any combination thereof designed to perform the functions described herein. Furthermore, the processing device 602 may be a microprocessor, or may be any conventional processor, controller, microcontroller, or state machine. The processing device 602 may also be implemented as a combination of computing devices (e.g., a combination of a DSP and a microprocessor, a plurality of microprocessors, one or more microprocessors in conjunction with a DSP core, or any other such configuration).

The system memory 604 may include non-volatile memory 608 and volatile memory 610. The non-volatile memory 608 may include read-only memory (ROM), erasable programmable read-only memory (EPROM), electrically erasable programmable read-only memory (EEPROM), and the like. The volatile memory 610 generally includes RAM (e.g., dynamic RAM (DRAM), such as synchronous DRAM (SDRAM)). A basic input/output system (BIOS) 612 may be stored in the non-volatile memory 608 and can include the basic routines that help to transfer information between elements within the computer system 600.

The system bus 606 provides an interface for system components including, but not limited to, the system memory 604 and the processing device 602. The system bus 606 may be any of several types of bus structures that may further interconnect to a memory bus (with or without a memory controller), a peripheral bus, and/or a local bus using any of a variety of commercially available bus architectures.

The computer system 600 may further include or be coupled to a non-transitory computer-readable storage medium, such as a storage device 614, which may represent an internal or external hard disk drive (HDD), flash memory, or the like. The storage device 614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 616 and any number of program modules 618 or other applications can be stored in the volatile memory 610, wherein the program modules 618 represent a wide array of computer-executable instructions corresponding to programs, applications, functions, and the like that may implement the functionality described herein in whole or in part, such as through instructions 620 on the processing device 602. The program modules 618 may also reside on the storage mechanism provided by the storage device 614. As such, all or a portion of the functionality described herein may be implemented as a computer program product stored on a transitory or non-transitory computer-usable or computer-readable storage medium, such as the storage device 614, volatile memory 610, non-volatile memory 608, instructions 620, and the like. The computer program product includes complex programming instructions, such as complex computer-readable program code, to cause the processing device 602 to carry out the steps necessary to implement the functions described herein.

An operator, such as the user, may also be able to enter one or more configuration commands to the computer system 600 through a keyboard, a pointing device such as a mouse, or a touch-sensitive surface, such as the display device, via an input device interface 622 or remotely through a web interface, terminal program, or the like via a communication interface 624. The communication interface 624 may be wired or wireless and facilitate communications with any number of devices via a communications network in a direct or indirect fashion. An output device, such as a display device, can be coupled to the system bus 606 and driven by a video port 626. Additional inputs and outputs to the computer system 600 may be provided through the system bus 606 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A mobile device, comprising:
   one or more sensors; and
   an impostor detection module coupled to the one or more sensors and configured to:
     receive a sequence of observed behavioral data or environmental data from the one or more sensors;
     implement a deep learning model that computes observed prediction error values based on the observed behavioral data or environmental data;
     perform a statistical inference computation that forms an observed prediction error distribution based on the observed prediction error values and generates a computed difference between a reference prediction error distribution and the observed prediction error distribution; and
     detect if an impostor is using the mobile device based on the computed difference between the reference prediction error distribution associated with an authorized user and the observed prediction error distribution.

2. The mobile device of claim 1, wherein the impostor detection module runs as a background process.

3. The mobile device of claim 1, wherein the impostor detection module is initiated by a triggering event.

4. The mobile device of claim 3, wherein the triggering event is at least one of a sensor input or a request for access to protected data.

5. The mobile device of claim 1, wherein:
   the one or more sensors comprise a three-dimensional accelerometer and a three-dimensional gyrometer; and
   the observed behavioral data comprises a motion pattern of the mobile device.

6. The mobile device of claim 5, wherein the impostor detection module is configured to detect if an impostor is using the mobile device by comparing the motion pattern to expected motion patterns of the authorized user.

7. The mobile device of claim 1, wherein the impostor detection module is a software module operated on a general-purpose processor.

8. The mobile device of claim 1, wherein the impostor detection module is a hardware module operated on a dedicated processor.

9. The mobile device of claim 1, wherein the statistical inference computation uses a Kolmogorov-Smirnov (KS) test to compare the observed behavioral data or the environmental data to the authorized user behavioral data or environmental data.

10. The mobile device of claim 9, wherein to perform the KS test, the impostor detection module is configured to:
    set a window of m reference prediction error values for a reference histogram;
    sort in ascending order the reference prediction error values in this window;
    accumulate a number of observed prediction error values that are less than each reference prediction error value in the window for n observed prediction error values;
    compare reference distributions and observed distributions by subtracting corresponding numbers in the reference histogram and an observed cumulative histogram that is based on the observed prediction error values;
    determine a maximum absolute value of differences between the reference histogram and the observed cumulative histogram; and
    compare the maximum absolute value of differences with a pre-computed threshold value to determine if a reference distribution and an observed distribution are the same or different.

11. A method for detecting an impostor, the method comprising:
    receiving sensor data from an electronic device wherein the sensor data comprises observed behavioral data or environmental data;
    implementing a deep learning model that computes observed prediction error values based on the observed behavioral data or environmental data;
    performing a statistical inference computation that forms an observed prediction error distribution based on the observed prediction error values and generates a computed difference between a reference prediction error distribution and the observed prediction error distribution; and
    determining if an observed user is an impostor based on the computed difference between the reference prediction error distribution associated with an authorized user and the observed prediction error distribution.

12. The method of claim 11, wherein the sensor data comprises motion data corresponding to a motion of the electronic device.

13. The method of claim 11, wherein determining the observed user is an impostor comprises comparing a pattern of motion associated with the observed behavioral data to a behavioral biometric signature corresponding to the authorized user.

14. The method of claim 11, wherein the environmental data is associated with an environment around the electronic device.

15. The method of claim 14, wherein the environmental data comprises at least one of ambient light data, location data, or temperature data.

16. The method of claim 11, further comprising denying the observed user access to authorized user data.

17. The method of claim 11, wherein determining the observed user is an impostor is performed implicitly such that the observed user is not required to comply with identity verification.

18. The method of claim 17, further comprising requesting explicit identity verification from the observed user in response to determining the observed user is an impostor.

19. The method of claim 11, wherein the deep learning model is a long short-term memory (LSTM) model.

20. A mobile device, comprising:
one or more sensors; and
an impostor detection module coupled to the one or more sensors and configured to:
receive observed behavioral data or environmental data from the one or more sensors; and
detect if an impostor is using the mobile device based on a computed difference between a reference prediction error distribution associated with an authorized user and an observed prediction error distribution based on at least one of the observed behavioral data or the environmental data,
wherein the impostor detection module further uses a Kolmogorov-Smirnov (KS) test to compare the observed behavioral data or the environmental data to the authorized user behavioral data or environmental data,
wherein to perform the KS test, the imposter detection module is configured to:
set a window of m reference prediction error values for a reference histogram;
sort in ascending order the reference prediction error values in this window;
accumulate a number of observed prediction error values that are less than each reference prediction error value in the window for n observed prediction error values;
compare reference distributions and observed distributions by subtracting corresponding numbers in the reference histogram and an observed cumulative histogram that is based on the observed prediction error values;
determine a maximum absolute value of differences between the reference histogram and the observed cumulative histogram; and
compare the maximum absolute value of differences with a pre-computed threshold value to determine if a reference distribution and an observed distributions are the same or different.

* * * * *

UNITED STATES PATENT AND TRADEMARK OFFICE
CERTIFICATE OF CORRECTION

PATENT NO. : 12,111,898 B2
APPLICATION NO. : 17/668142
DATED : October 8, 2024
INVENTOR(S) : Ruby Lee and Guangyuan Hu It is certified that error appears in the above-identified patent and that said Letters Patent is hereby corrected as shown below:

In the Claims

In Column 24, Lines 21 and 22, Claim 20 replace "observed distributions" with --observed distribution--.

Signed and Sealed this
Twelfth Day of November, 2024

Katherine Kelly Vidal
*Director of the United States Patent and Trademark Office*